US006752408B2

(12) United States Patent
La

(10) Patent No.: US 6,752,408 B2
(45) Date of Patent: Jun. 22, 2004

(54) VEHICLE SUSPENSION

(75) Inventor: Min-Hwan La, Gwacheon-si (KR)

(73) Assignee: KIA Motors Co., Ltd., Gyeonggi-do (KR)

(*) Notice: Subject to any disclaimer, the term of this patent is extended or adjusted under 35 U.S.C. 154(b) by 0 days.

(21) Appl. No.: 10/123,664

(22) Filed: Apr. 16, 2002

(65) Prior Publication Data

US 2003/0168827 A1 Sep. 11, 2003

(30) Foreign Application Priority Data

Mar. 7, 2002 (KR) .................................... 2002-0012171

(51) Int. Cl.[7] ................................................ B60G 3/18
(52) U.S. Cl. ...................... 280/124.135; 280/124.137; 280/124.145; 280/124.146; 280/124.147; 280/124.152; 280/124.154; 280/154.155
(58) Field of Search ................... 280/124.135, 124.137, 280/124.141, 124.145, 124.146, 124.147, 124.149, 124.152, 124.154, 124.155, 124.165, 124.167, 124.177, 124.179, FOR 117, FOR 119, FOR 124, FOR 153, FOR 158, FOR 181

(56) References Cited

U.S. PATENT DOCUMENTS

| 2,198,680 | A | * | 4/1940 | Slack |
| 4,066,278 | A | * | 1/1978 | Takagi |
| 5,487,535 | A | | 1/1996 | Carter et al. |
| RE35,168 | E | | 3/1996 | Golpe |
| 5,558,360 | A | | 9/1996 | Lee |
| 5,620,199 | A | | 4/1997 | Lee |
| 5,697,633 | A | | 12/1997 | Lee |
| 6,231,062 | B1 | | 5/2001 | Sutton |

FOREIGN PATENT DOCUMENTS

JP         3-82614    *   4/1991   .......... 280/124.127

* cited by examiner

Primary Examiner—Eric Culbreth
(74) Attorney, Agent, or Firm—David Tichane

(57) ABSTRACT

The present invention provides a vehicle suspension where bump stoppers are installed in an upper end of a strut and on an upper end of a lower arm respectively so that the bump stoppers can operate separately or simultaneously, depending on the size of a load, to absorb or reduce vibration or shocks. The vehicle suspension consists of an upper arm assembly being connected to an upper portion of a drive shaft assembly where wheels are connected; a lower arm assembly being connected to a lower bracket of said drive shaft assembly, and including a bump stopper at an upper surface which starts contacting a chassis frame's stopper bracket if a load from a road surface is the same as or more than a preset base load; a shock absorber, at a lower portion, being attached to said lower arm assembly, and including a main spring located on an outer surface, a strut assembly with a striking plate, an upper mount attached to a vehicle body and other bump stopper in an upper face which starts contacting the striking plate if a load from the road surface is the same as or less than said preset base load; and a stabilizer, of which one end is connected to the lower arm assembly.

3 Claims, 3 Drawing Sheets

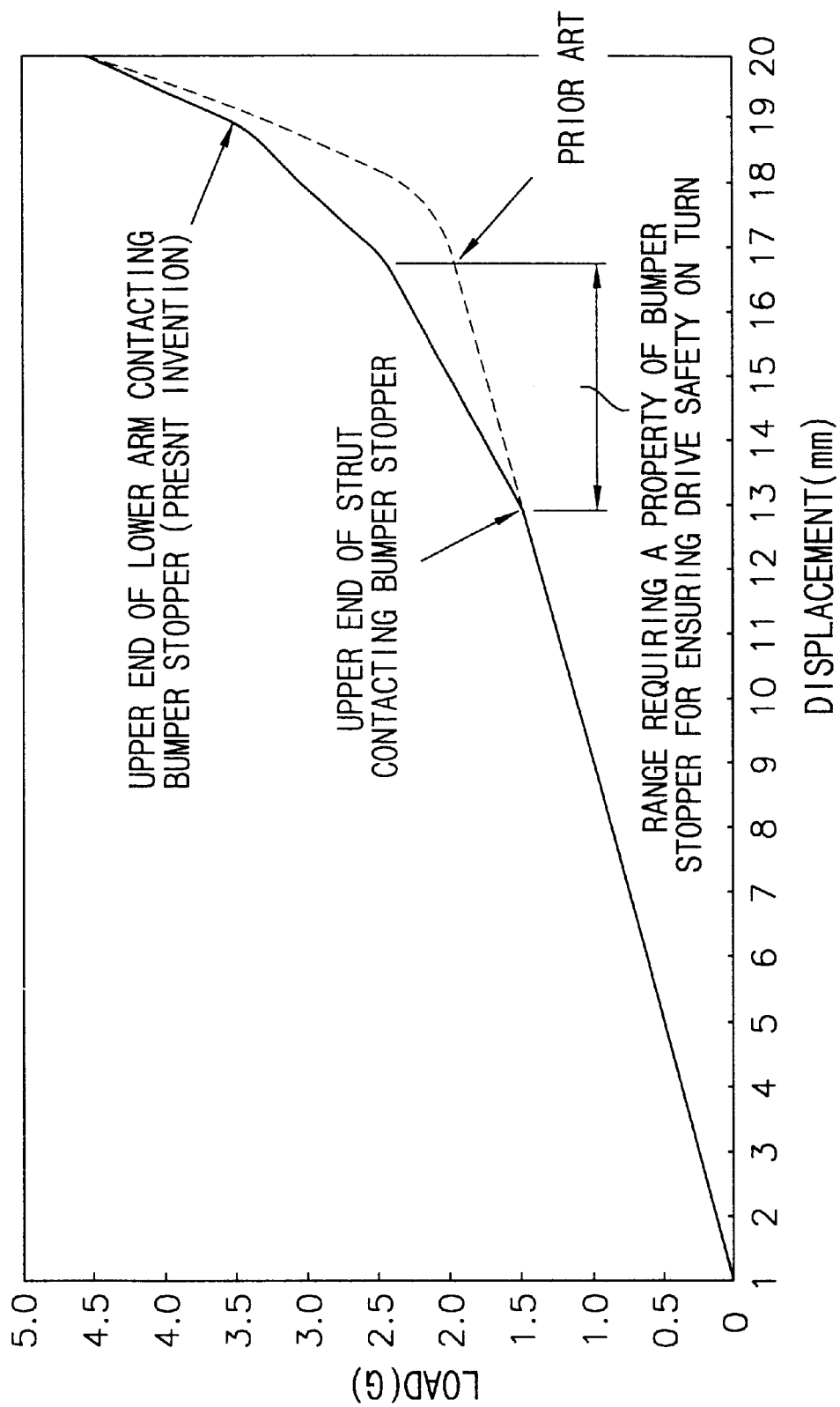

VEHICLE SUSPENSION

CROSS REFERENCE TO RELATED APPLICATION

Applicant claims priority from Korean patent application No. 2002-12171 filed Mar. 17, 2002.

BACKGROUND OF THE INVENTION

1. Field of the Invention

The present invention relates to a vehicle suspension. More specifically, this invention is a vehicle suspension that has a bump stopper in an upper end of a shock absorber's strut and another bump stopper on the upper end of a lower arm, which operate either separately or simultaneously, depending on the size of a load, in order to absorb or reduce shocks and vibration.

2. Description of the Related Art

Generally, a suspension connects an axle and a vehicle body in a vehicle such as a passenger car. It is designed to prevent shocks or vibration from a road surface from being transferred to the vehicle body in order to enhance passenger comfort and to keep freight stable. Such suspension consists of a chassis spring that absorbs shocks from the road surface, a shock absorber that improves ride comfort by controlling the free vibration of the chassis spring, and a stabilizer that prevents rolling of the vehicle. In addition, a spring, a bump stopper, and a stabilizer bar serve as a buffer or shock absorber in such suspension. The spring and the bump stopper serve as a buffer in both cases of a bump and a roll while the stabilizer bar serves as a buffer only in the case of a roll. In general, a front-wheel suspension has a smaller load change than a rear-wheel suspension depending on whether the vehicle is loaded or unloaded, so it adopts a linear constant spring with less changes in a spring constant. The rear-wheel suspension, however, adopts a progressive spring, in which the spring constant changes during loading and unloading, to enhance ride comfort. In addition, the bump stopper in the suspension is designed to control the maximum height of the bump. It also supplements the function of a spring to absorb shocks when an excess load from the road surface is transferred to the suspension, which is caused when the vehicle runs on an irregular or raised road. In the case of a vehicle's turn, it controls roll of the vehicle. To this end, a conventional suspension has a bump stopper in the upper end of a shock absorber damper, or one or two bump stoppers in the upper portion of the lower arm.

The bump stopper installed in the damper or the lower arm should be able to secure endurance and satisfy the restriction of the maximum bump height in case of an excess load from the road. To this end, the bump stopper is set to have a spring constant over four times bigger than that of the shock absorber's main spring. If the axial load is 1G in case of loading, the bump stopper is generally set to start contacting corresponding subjects when the axial load increases to 1.3G or 1.5G.

However, it is known that the conventional suspension with a stopper damper installed either in the damper or in the lower arm has several problems. First, if the bump stopper is set to start contacting at a relatively small load in order to control a roll motion in a normal turn or to secure an appropriate ride frequency within the main spring's ordinary range, the bump stopper starts contacting the upper surface of a damper strut prematurely. As a result, shocks cannot be absorbed softly, reducing ride comfort. This phenomenon is so-called bottoming shock.

Also, with a bump stopper installed either in the shock absorber or in the lower arm, the exact timing of contacts between the stopper and the appropriate object cannot be set according to various sizes of the axial load from the road.

If the initial spring constant of the bump stopper is cut to the level the same as or one half that of the main spring to reduce the bottoming shock phenomenon, the bump stopper's endurance is hampered, making it easily damaged or ruined.

SUMMARY OF THE INVENTION

The present invention is designed to address the aforementioned problems. The main purpose of the present invention is to provide a vehicle suspension that can effectively absorb or reduce shocks or vibration of various magnitudes from the road surface when a car runs normally or makes a turn.

The second purpose of the present invention is to provide a vehicle suspension that can absorb and reduce shocks and vibration of various magnitudes from the road surface.

The third purpose of the present invention is to provide a suspension that has a bump stopper in a shock absorber and a bump stopper in a lower arm.

The aforementioned goals can be achieved by a vehicle suspension comprising: an upper arm assembly being connected to an upper portion of a drive shaft assembly where wheels are connected; a lower arm assembly being connected to a lower bracket of said drive shaft assembly and including a bump stopper at an upper surface which starts contacting a chassis frame's stopper bracket if a load from a road surface is the same as or more than a preset base load; a strut assembly of which a lower portion is attached to said lower arm assembly, and including a main spring located on an outer surface and a striking plate; a shock absorber with an upper mount attached to a vehicle body and a bump stopper in an upper face which starts contacting the striking plate if a load from the road surface is the same as or less than said preset base load; and a stabilizer, of which one end is connected to the lower arm assembly.

According to the present invention, the bump stoppers can absorb or reduce shock and vibration of various magnitudes transferred from the road surface when a vehicle normally runs or makes a turn, improving safety and ride comfort.

The above and other advantages of embodiments of this invention will be apparent from the following more detailed description when taken in conjunction with the accompanying drawings.

BRIEF DESCRIPTION OF DRAWINGS

FIG. 3 is a graph that shows the buffer effect due to the present invention.

DETAILED DESCRIPTION OF THE PREFERRED EMBODIMENT

Figure 1:
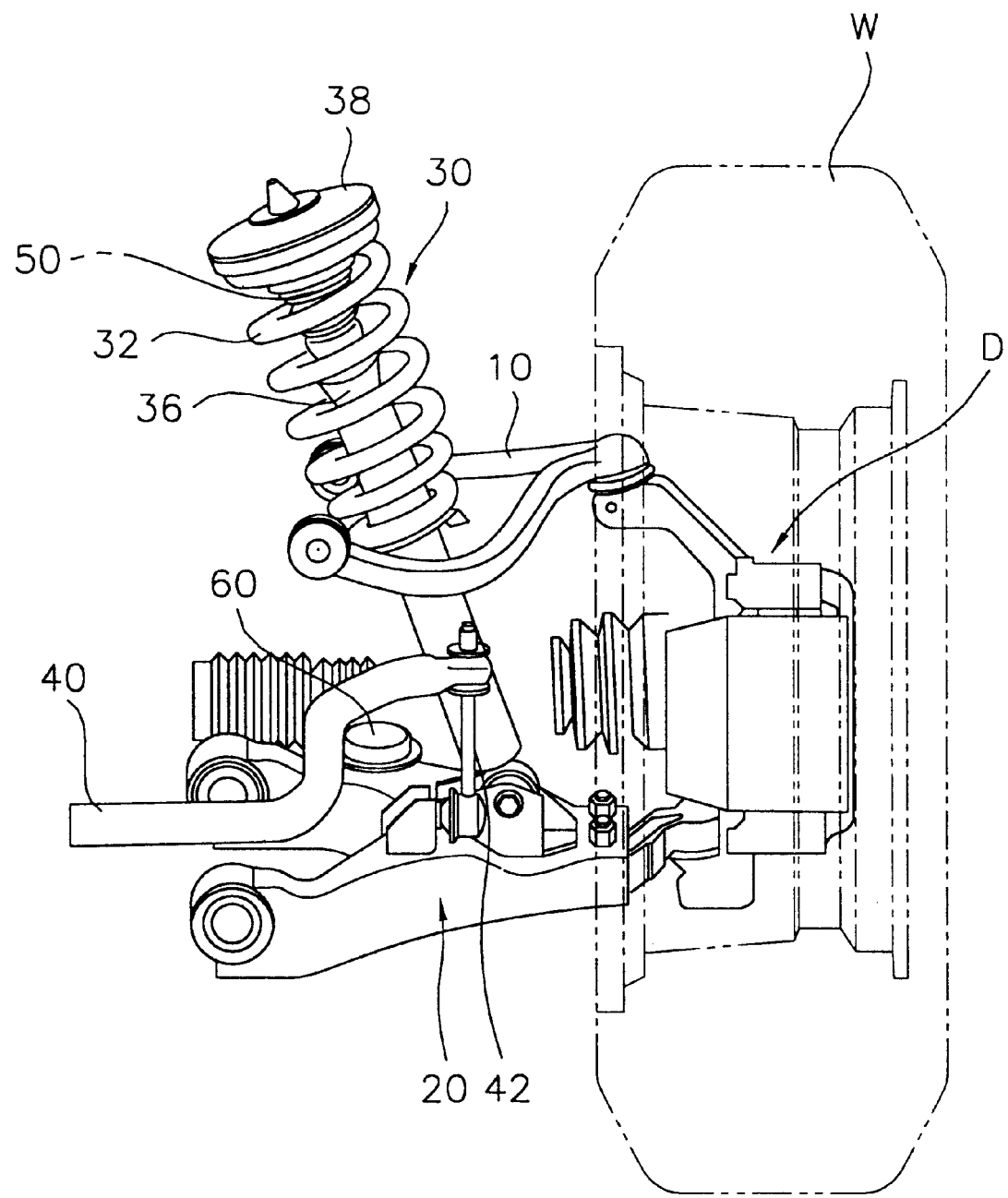
FIG. 1 is a perspective view of a vehicle suspension according to an embodiment of the present invention.
Figure 2:
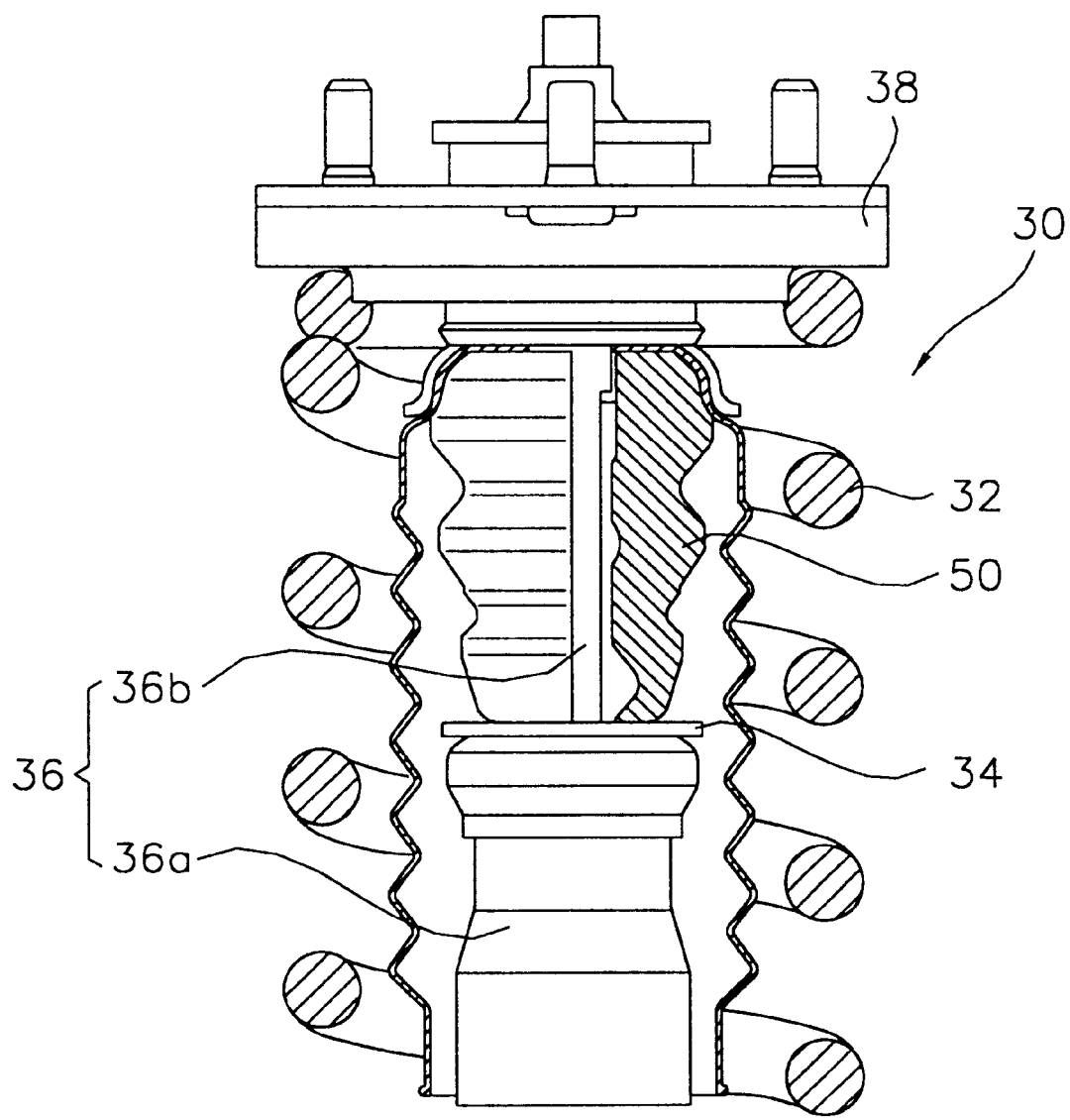
FIG. 2 is a partial section of the upper end of a shock absorber in the suspension.

In FIG. 1, a vehicle suspension according to present invention basically has an upper arm assembly 10 that is connected to an upper bracket of a drive shaft assembly D that is connected to wheels W, and a lower arm assembly 20 that is connected to a lower bracket of the drive shaft assembly D. Also, the suspension has a shock absorber 30 of which a lower end is attached to the lower arm assembly 20. As described in FIG. 2, the shock absorber 30 basically has a main spring 32, a strut assembly 36 that has a striking plate 34 in the upper end, and a upper mount 38 attached to the vehicle body. The present invention has a stabilizer 40 to reduce the inclination of the vehicle body. The strut assembly 36 generally consists of a cylinder portion 36a and a piston rod portion 36b that reciprocates in the cylinder portion 36a. An end of the stabilizer 40 is operationally connected to the appropriate location of the lower arm by a control link 42.

In particular, the shock absorber 30 and the lower arm assembly 20 alike have a bump stopper to absorb or reduce various shocks or vibration transferred to wheels from the road surface. Namely, as shown in detail in FIG. 2, a bump stopper 50 is installed in the upper end of the shock absorber 30, more specifically the lower portion of the upper mount 38 in a way that it encircles the upper end of the piston rod portion 36b and can serve as a buffer. In particular, the bump stopper is preferably structured in a way that it can control a roll motion when a vehicle runs in a normal condition or makes a turn, and can play a role of a supplementary spring.

Another bump stopper is installed on the surface of the lower arm assembly 20; more specifically a stopper bracket provided on one side of a chassis frame (not shown) comes down and contacts the upper end of the lower arm assembly. The bump stopper is designed so that it can absorb excess shocks when they are transferred from the road surface, control the maximum bump height, and control the roll motion in a sharp turn.

As a result, when the shock absorber 30 and the lower arm assembly 20 respectively operate in case of a load either bigger or smaller than the base load, bump stoppers 50, 60 installed to each of them share the loads of the shock within a certain range. Namely, based on an arbitrary base load that is optimally set according to the size of the load from the road surface to the suspension or to the size of the suspension, or the weight of the vehicle body, the bump stopper 50 installed to the shock absorber 30 mainly operates in case of an ordinary load less than the base load while the bump stopper 60 installed to the lower arm assembly 20 operates in case of a load more than base load.

Also, in case of the aforementioned conditions, the lower portion of the bump stopper 50 installed to the shock absorber 30 starts contacting the striking plate 34 that is in the upper end of the cylinder portion 36a when a load is the same as or less than the base load. In addition, the spring constant of the bump stopper 50 is preferably set the same as or one half that of the main spring 32 of the shock absorber 30 to prevent a bottoming shock. However, the bump stopper 60 installed to the upper surface of the lower arm 20 starts contacting the chassis frame's stopper bracket when the load is about the same as or more than the base load. The spring constant of the bump stopper 60 is preferably four times bigger than that of the main spring 34 of the shock absorber 30 to control a bump stroke of the suspension.

In the following, a vehicle's operation mode based on the present invention will be described in detail in reference to specific embodiments.

First of all, for a specific embodiment, the critical load standard value between the shock absorber 30 and the lower arm 20 can be set as 1.4G as an example. The reason why the base load is set to 1.4G is that the stopper starts contacting when a load falls in the range of 1.3G and 1.5G, namely about 1.4G, if an axial load in a loaded vehicle is hypothetically 1G. Under this condition, if the load equivalent to shocks or vibration transferred to the suspension from the road surface is less than 1.4G, the shock absorber mainly functions as a buffer. If the load is more than 1.4G, the lower arm 20, or both the shock absorber 30 and the lower arm 20 functions as a buffer.

As such, with the base load set, if a load of less than 1.4G is applied to the suspension on a vehicle's normal turn, the shock absorber 30 absorbs most of it, serving as a buffer. If the load equivalent to shocks or vibration applied to the suspension is approximately 1.0G to 1.2G, which is close to 1.4G, the bump stopper 50 installed to the upper portion of the shock absorber 30 starts contacting the striking plate 34 of the strut assembly 36, initiating additional buffering. In this case, the bump stopper 50 can prevent a rough and hard bottoming shock because its spring constant is the same as or one half that of the main spring 32. Accordingly, it can control the roll motion and serve as a supplementary spring in case of a normal turn when shocks and vibration applied are less than the base load.

If an excess load, e.g. a load of more than 1.4G, is applied to the suspension because the vehicle runs on an irregular road surface, it is more than the shock absorber 30 can handle. Therefore, the lower arm 20 starts buffering. If the load is more than 1.4G or 1.5G, the bump stopper 60 in the lower arm 20 starts contacting the stopper mount bracket of the chassis frame (not shown), initiating additional buffering. In this case, the bump stopper 60 can stably control the overall bump stroke of the suspension because its spring constant is over four times bigger than that of the main spring 32.

The graph in FIG. 3 shows the results of the tests from the aforementioned embodiments. Based on the graph, under the condition of the aforementioned base load, the bump stopper in the shock absorber and the striking plate are set to start contacting relatively early while the bump stopper in the lower arm and the chassis frame's stopper bracket are set to start contacting relatively late, showing a characteristic of buffering shocks.

Accordingly, shocks of various magnitudes applied to the suspension from the road surface are shared appropriately between the shock absorber and the lower arm. As a result, shocks and vibration can be effectively and stably absorbed and buffered in a broader range.

In conclusion, the invented vehicle suspension has two bump stoppers: one in the upper end of the shock absorber and the other on the upper end of the lower arm. One of the bump stoppers operates when a load is less than the base load and the other operates when a load is more than the base load. The bump stoppers can absorb or reduce shock and vibration of various magnitudes transferred from the road surface when a vehicle normally runs or makes a turn, improving safety and ride comfort.

While the present invention has been described with regards to specific embodiments and specifications, those skilled in the art will recognize that changes can be made in form and detail without departing from the spirit and scope of the invention. Accordingly, the foregoing embodiments are meant to be illustrative of the invention, and reference should be made to the appended claims for an understanding of the scope of the invention.

What is claimed is:

1. A vehicle suspension comprising:
    an upper arm assembly being connected to an upper portion of a drive shaft assembly where wheels are connected;

a lower arm assembly being connected to a lower bracket of said drive shaft assembly, and including a bump stopper at an upper surface which starts contacting a chassis frame's stopper bracket if a load from a road surface is the same as or more than a preset base load;

a shock absorber, a lower portion attached to said lower arm assembly, and including a main spring located on an outer surface, a strut assembly with a striking plate, an upper mount attached to a vehicle body and other bump stopper in an upper face which starts contacting the striking plate if a load from the road surface is the same as or less than said preset base load; and a stabilizer, of which one end is connected to the lower arm assembly.

2. The vehicle suspension as claimed in claim 1, wherein the bump stopper in said shock absorber has a spring constant that is set the same as or one half that of the main spring.

3. The vehicle suspension as claimed in claim 1, wherein the bump stopper on said lower arm assembly has a spring constant that is set over four times greater than that of the main spring of said shock absorber.

* * * * *